(12) United States Patent
Green et al.

(10) Patent No.: US 8,932,759 B2
(45) Date of Patent: Jan. 13, 2015

(54) METHOD OF FABRICATING STRUCTURED PARTICLES COMPOSED OF SILICON OR A SILICON-BASED MATERIAL

(75) Inventors: Mino Green, London (GB); Feng-Ming Liu, Reading (GB)

(73) Assignee: Nexeon Ltd., Oxfordshire (GB)

( * ) Notice: Subject to any disclaimer, the term of this patent is extended or adjusted under 35 U.S.C. 154(b) by 616 days.

(21) Appl. No.: 13/123,363

(22) PCT Filed: Oct. 2, 2009

(86) PCT No.: PCT/GB2009/002351
§ 371 (c)(1),
(2), (4) Date: Jul. 1, 2011

(87) PCT Pub. No.: WO2010/040986
PCT Pub. Date: Apr. 15, 2010

(65) Prior Publication Data
US 2011/0250498 A1  Oct. 13, 2011

(30) Foreign Application Priority Data

Oct. 10, 2008 (GB) .................................. 0818644.7

(51) Int. Cl.
*H01M 4/13* (2010.01)
*H01M 4/34* (2006.01)
(Continued)

(52) U.S. Cl.
CPC ............... *H01M 4/134* (2013.01); *C09K 13/08* (2013.01); *Y02E 60/122* (2013.01); *H01M 10/052* (2013.01); *H01M 4/049* (2013.01)
USPC ........................................................ 429/219

(58) Field of Classification Search
USPC ........................................................ 429/219
See application file for complete search history.

(56) References Cited

U.S. PATENT DOCUMENTS

| 3,351,445 A | 11/1967 | Fielder et al. |
| 4,002,541 A | 1/1977 | Streander |

(Continued)

FOREIGN PATENT DOCUMENTS

| CN | 1821446 A | 8/2006 |
| CN | 101266919 A | 9/2008 |

(Continued)

OTHER PUBLICATIONS

Chan et al., "Surface Chemistry and Morphology of the Solid Electrolyte Interphase on Silicon Nanowire Lithium-Ion Battery Anodes", Journal of Power Sources, 189(2), 1132-1140, (2009).

(Continued)

*Primary Examiner* — Ula C. Ruddock
*Assistant Examiner* — Jacob Marks
(74) *Attorney, Agent, or Firm* — Fay Sharpe LLP

(57) ABSTRACT

A process of etching silicon includes treating silicon, e.g. granules or bulk material, with an etching solution, including HF, $Ag^+$ ions and nitrate ions thereby etching the silicon to form silicon having etched pillars on its surface, which silicon includes a surface deposit of silver. The etched silicon is then separated from the spent etching solution. The silver from the etched silicon is dissolved using nitric acid to form a solution containing $Ag^+$ ions and nitrate ions. The solution containing $Ag^+$ ions and nitrate ions is mixed with further HF to form a further etching solution. The further etching solution is used to treat further silicon. The pillars may be used as an anode material in a Li-ion battery.

20 Claims, 1 Drawing Sheet

(51) Int. Cl.
*H01M 10/32* (2006.01)
*H01M 4/54* (2006.01)
*C09K 13/08* (2006.01)
*H01M 4/134* (2010.01)
*H01M 4/04* (2006.01)
*H01M 10/052* (2010.01)

(56) References Cited

U.S. PATENT DOCUMENTS

| | | |
|---|---|---|
| 4,436,796 A | 3/1984 | Huggins et al. |
| 4,950,566 A | 8/1990 | Huggins et al. |
| 5,260,148 A | 11/1993 | Idota |
| 5,262,021 A | 11/1993 | Lehmann et al. |
| 5,660,948 A | 8/1997 | Barker |
| 5,907,899 A | 6/1999 | Dahn et al. |
| 5,980,722 A | 11/1999 | Kuroda et al. |
| 6,022,640 A | 2/2000 | Takada et al. |
| 6,042,969 A | 3/2000 | Yamada et al. |
| 6,063,995 A | 5/2000 | Bohland et al. |
| 6,235,427 B1 | 5/2001 | Idota et al. |
| 6,296,969 B1 | 10/2001 | Yano et al. |
| 6,334,939 B1 | 1/2002 | Zhou et al. |
| 6,337,156 B1 | 1/2002 | Narang et al. |
| 6,353,317 B1 | 3/2002 | Green et al. |
| 6,399,177 B1 | 6/2002 | Fonash et al. |
| 6,399,246 B1 | 6/2002 | Vandayburg et al. |
| 6,589,696 B2 | 7/2003 | Matsubara et al. |
| 6,605,386 B1 | 8/2003 | Kasamatsu et al. |
| 6,620,547 B1 | 9/2003 | Sung et al. |
| 6,887,511 B1 | 5/2005 | Shima et al. |
| 6,916,679 B2 | 7/2005 | Snyder et al. |
| 7,033,936 B1 | 4/2006 | Green |
| 7,051,945 B2 | 5/2006 | Empedocles et al. |
| 7,070,632 B1 | 7/2006 | Visco et al. |
| 7,094,499 B1 | 8/2006 | Hung |
| 7,147,894 B2 | 12/2006 | Zhou et al. |
| 7,192,673 B1 | 3/2007 | Ikeda et al. |
| 7,311,999 B2 | 12/2007 | Kawase et al. |
| 7,318,982 B2 | 1/2008 | Gozdz et al. |
| 7,348,102 B2 | 3/2008 | Li et al. |
| 7,358,011 B2 | 4/2008 | Fukuoka et al. |
| 7,378,041 B2 | 5/2008 | Asao et al. |
| 7,425,285 B2 | 9/2008 | Asao et al. |
| 7,476,469 B2 | 1/2009 | Ota et al. |
| 7,569,202 B2 | 8/2009 | Farrell et al. |
| 7,659,034 B2 | 2/2010 | Minami et al. |
| 7,674,552 B2 | 3/2010 | Nakai et al. |
| 7,767,346 B2 | 8/2010 | Kim et al. |
| 7,862,933 B2 | 1/2011 | Okumura et al. |
| 8,034,485 B2 | 10/2011 | Dehn et al. |
| 8,597,831 B2 | 12/2013 | Green et al. |
| 2001/0023986 A1 | 9/2001 | Mancevski |
| 2002/0148727 A1 | 10/2002 | Zhou et al. |
| 2003/0135989 A1 | 7/2003 | Huggins et al. |
| 2004/0072067 A1 | 4/2004 | Minami et al. |
| 2004/0126659 A1 | 7/2004 | Graetz et al. |
| 2004/0151987 A1 | 8/2004 | Kawase et al. |
| 2004/0166319 A1 | 8/2004 | Li et al. |
| 2004/0185346 A1 | 9/2004 | Takeuchi et al. |
| 2004/0197660 A1 | 10/2004 | Sheem et al. |
| 2004/0214085 A1 | 10/2004 | Sheem et al. |
| 2004/0224231 A1 | 11/2004 | Fujimoto et al. |
| 2004/0241548 A1 | 12/2004 | Nakamoto et al. |
| 2005/0042515 A1 | 2/2005 | Hwang et al. |
| 2005/0079414 A1 | 4/2005 | Yamamoto et al. |
| 2005/0079420 A1 | 4/2005 | Cho et al. |
| 2005/0118503 A1 | 6/2005 | Honda et al. |
| 2005/0191550 A1 | 9/2005 | Satoh et al. |
| 2005/0193800 A1 | 9/2005 | DeBoer et al. |
| 2005/0214644 A1 | 9/2005 | Aramata et al. |
| 2006/0003226 A1 | 1/2006 | Sawa et al. |
| 2006/0004226 A1 | 1/2006 | Machhammer et al. |
| 2006/0019115 A1 | 1/2006 | Wang et al. |
| 2006/0019168 A1 | 1/2006 | Li et al. |
| 2006/0024582 A1 | 2/2006 | Li et al. |
| 2006/0051670 A1 | 3/2006 | Aramata et al. |
| 2006/0057463 A1 | 3/2006 | Gao et al. |
| 2006/0088767 A1 | 4/2006 | Li et al. |
| 2006/0097691 A1 | 5/2006 | Green |
| 2006/0134516 A1 | 6/2006 | Im et al. |
| 2006/0134518 A1 | 6/2006 | Kogetsu et al. |
| 2006/0147800 A1 | 7/2006 | Sato et al. |
| 2006/0154071 A1 | 7/2006 | Homma et al. |
| 2006/0166093 A1 | 7/2006 | Zaghib et al. |
| 2006/0175704 A1 | 8/2006 | Shimizu et al. |
| 2006/0257307 A1 | 11/2006 | Yang |
| 2006/0263687 A1 | 11/2006 | Leitner et al. |
| 2006/0275663 A1 | 12/2006 | Matsuno et al. |
| 2006/0275668 A1 | 12/2006 | Peres et al. |
| 2006/0286448 A1 | 12/2006 | Snyder et al. |
| 2007/0003835 A1 | 1/2007 | Hasegawa et al. |
| 2007/0026313 A1 | 2/2007 | Sano |
| 2007/0031733 A1 | 2/2007 | Kogetsu et al. |
| 2007/0037063 A1 | 2/2007 | Choi et al. |
| 2007/0048609 A1 | 3/2007 | Yeda et al. |
| 2007/0059598 A1 | 3/2007 | Yang |
| 2007/0065720 A1 | 3/2007 | Hasewaga et al. |
| 2007/0072074 A1 | 3/2007 | Yamamoto et al. |
| 2007/0087268 A1 | 4/2007 | Kim et al. |
| 2007/0099084 A1 | 5/2007 | Huang et al. |
| 2007/0099085 A1 | 5/2007 | Choi et al. |
| 2007/0105017 A1 | 5/2007 | Kawase et al. |
| 2007/0117018 A1 | 5/2007 | Huggins |
| 2007/0122702 A1 | 5/2007 | Sung et al. |
| 2007/0148544 A1 | 6/2007 | Le |
| 2007/0172732 A1 | 7/2007 | Jung et al. |
| 2007/0184345 A1 | 8/2007 | Neudecker et al. |
| 2007/0190413 A1 | 8/2007 | Lee et al. |
| 2007/0202395 A1 | 8/2007 | Snyder et al. |
| 2007/0202402 A1 | 8/2007 | Asahina et al. |
| 2007/0207080 A1 | 9/2007 | Yang |
| 2007/0207385 A1 | 9/2007 | Liu et al. |
| 2007/0209584 A1 | 9/2007 | Kalynushkin et al. |
| 2007/0212538 A1 | 9/2007 | Niu |
| 2007/0218366 A1 | 9/2007 | Kalynushkin et al. |
| 2007/0224508 A1 | 9/2007 | Aramata et al. |
| 2007/0224513 A1 | 9/2007 | Kalynushkin et al. |
| 2007/0238021 A1 | 10/2007 | Liu et al. |
| 2007/0243469 A1 | 10/2007 | Kim et al. |
| 2007/0264564 A1 | 11/2007 | Johnson et al. |
| 2007/0264574 A1 | 11/2007 | Kim et al. |
| 2007/0269718 A1 | 11/2007 | Krause et al. |
| 2007/0277370 A1 | 12/2007 | Kalynushkin et al. |
| 2008/0003496 A1 | 1/2008 | Neudecker et al. |
| 2008/0003503 A1 | 1/2008 | Kawakami et al. |
| 2008/0020281 A1 | 1/2008 | Kogetsu et al. |
| 2008/0038638 A1 | 2/2008 | Zhang et al. |
| 2008/0090149 A1 | 4/2008 | Sano et al. |
| 2008/0096110 A1 | 4/2008 | Bito et al. |
| 2008/0107967 A1 | 5/2008 | Liu et al. |
| 2008/0113271 A1 | 5/2008 | Ueda et al. |
| 2008/0118834 A1 | 5/2008 | Yew et al. |
| 2008/0124631 A1 | 5/2008 | Fukui et al. |
| 2008/0131782 A1 | 6/2008 | Hagiwara et al. |
| 2008/0138710 A1 | 6/2008 | Liaw et al. |
| 2008/0138716 A1 | 6/2008 | Iwama et al. |
| 2008/0145752 A1 | 6/2008 | Hirose et al. |
| 2008/0145759 A1 | 6/2008 | Sung et al. |
| 2008/0160415 A1 | 7/2008 | Wakita et al. |
| 2008/0176139 A1 | 7/2008 | White et al. |
| 2008/0206631 A1 | 8/2008 | Christensen et al. |
| 2008/0206641 A1 | 8/2008 | Christensen et al. |
| 2008/0233479 A1 | 9/2008 | Sung et al. |
| 2008/0233480 A1 | 9/2008 | Sung et al. |
| 2008/0241647 A1 | 10/2008 | Fukui et al. |
| 2008/0241703 A1 | 10/2008 | Yamamoto et al. |
| 2008/0248250 A1 | 10/2008 | Flemming et al. |
| 2008/0261112 A1 | 10/2008 | Nagata et al. |
| 2008/0305391 A1 | 12/2008 | Hirose et al. |
| 2009/0053589 A1 | 2/2009 | Obrovac et al. |
| 2009/0078982 A1 | 3/2009 | Rachmady et al. |
| 2009/0087731 A1 | 4/2009 | Fukui et al. |
| 2009/0101865 A1 | 4/2009 | Matsubara et al. |

(56) References Cited

U.S. PATENT DOCUMENTS

| | | |
|---|---|---|
| 2009/0117466 A1 | 5/2009 | Zhamu et al. |
| 2009/0186267 A1 | 7/2009 | Tiegs |
| 2009/0239151 A1 | 9/2009 | Nakanishi et al. |
| 2009/0253033 A1 | 10/2009 | Hirose et al. |
| 2009/0269677 A1 | 10/2009 | Hirose et al. |
| 2009/0305129 A1 | 12/2009 | Fukui et al. |
| 2010/0085685 A1 | 4/2010 | Pinwill |
| 2010/0092868 A1 | 4/2010 | Kim et al. |
| 2010/0124707 A1 | 5/2010 | Hirose et al. |
| 2010/0136437 A1 | 6/2010 | Nishida et al. |
| 2010/0233539 A1* | 9/2010 | Green et al. ............... 429/218.1 |
| 2010/0285358 A1 | 11/2010 | Cui et al. |
| 2010/0297502 A1 | 11/2010 | Zhu et al. |
| 2010/0330419 A1 | 12/2010 | Cui et al. |

FOREIGN PATENT DOCUMENTS

| | | |
|---|---|---|
| CN | 101442124 A | 5/2009 |
| DE | 199 22 257 A1 | 11/2000 |
| DE | 103 47 570 A1 | 5/2005 |
| EP | 0 281 115 | 9/1988 |
| EP | 0 553 465 A1 | 8/1993 |
| EP | 0 820 110 A2 | 1/1998 |
| EP | 1 011 160 A1 | 6/2000 |
| EP | 0 936 687 B1 | 12/2001 |
| EP | 1 231 653 A1 | 8/2002 |
| EP | 1 231 654 A1 | 8/2002 |
| EP | 1 258 937 A1 | 11/2002 |
| EP | 1 083 614 B1 | 5/2003 |
| EP | 1 313 158 A2 | 5/2003 |
| EP | 1 335 438 A1 | 8/2003 |
| EP | 1 289 045 B1 | 3/2006 |
| EP | 1 657 769 A1 | 5/2006 |
| EP | 1 850 409 A1 | 10/2007 |
| EP | 1 771 899 B1 | 2/2008 |
| EP | 1 657 768 B1 | 5/2008 |
| EP | 2 058 882 | 5/2009 |
| EP | 2 204 868 A3 | 7/2010 |
| FR | 2 885 913 B1 | 8/2007 |
| GB | 980513 | 1/1965 |
| GB | 1 014 706 | 12/1965 |
| GB | 2 395 059 A | 5/2004 |
| GB | 2 464 157 B | 1/2010 |
| GB | 2 464 158 | 4/2010 |
| JP | 02-209492 A | 8/1990 |
| JP | 6-283156 | 10/1994 |
| JP | 10-046366 | 2/1998 |
| JP | 10-83817 | 3/1998 |
| JP | 10-199524 | 7/1998 |
| JP | 2000-3727 | 1/2000 |
| JP | 2000-173594 | 6/2000 |
| JP | 2000-348730 A | 12/2000 |
| JP | 2001-291514 | 10/2001 |
| JP | 2002-279974 A | 9/2002 |
| JP | 2002-313319 A | 10/2002 |
| JP | 2003-017040 | 1/2003 |
| JP | 2003-168426 | 6/2003 |
| JP | 04-607488 | 2/2004 |
| JP | 2004-71305 | 3/2004 |
| JP | 2004-095264 | 3/2004 |
| JP | 2004-214054 | 7/2004 |
| JP | 2004-281317 | 10/2004 |
| JP | 2004-296386 A | 10/2004 |
| JP | 2004-533699 A | 11/2004 |
| JP | 2005-310759 A | 11/2005 |
| JP | 2006-505901 A | 2/2006 |
| JP | 2006-276214 A | 10/2006 |
| JP | 2006-290938 A | 10/2006 |
| JP | 2006-335410 A | 12/2006 |
| JP | 2007080827 A | 3/2007 |
| JP | 2007-165079 A | 6/2007 |
| JP | 2008-034266 | 2/2008 |
| JP | 2008-186732 | 8/2008 |
| JP | 2008210618 A | 9/2008 |
| JP | 2008-234988 | 10/2008 |
| JP | 2008277000 A | 11/2008 |
| JP | 2009523923 A | 6/2009 |
| JP | 2009-252348 A | 10/2009 |
| JP | 2010192444 A | 9/2010 |
| JP | 5000787 B2 | 8/2012 |
| JP | 2013510405 A | 3/2013 |
| KR | 20050090218 A | 9/2005 |
| KR | 2007-023141 | 2/2007 |
| KR | 2007-0110569 A | 11/2007 |
| KR | 2008-038806 A | 5/2008 |
| NL | 1015956 | 8/2000 |
| SU | 471402 | 5/1975 |
| SU | 544019 | 1/1977 |
| WO | WO 99/33129 | 7/1999 |
| WO | WO 02/25356 A2 | 3/2002 |
| WO | WO 2004/109839 A1 | 12/2004 |
| WO | WO 2005/011030 A1 | 2/2005 |
| WO | WO 2005/113467 A1 | 12/2005 |
| WO | WO 2005/119753 A2 | 12/2005 |
| WO | WO 2006/067891 A1 | 6/2006 |
| WO | WO 2007/083152 | 7/2007 |
| WO | WO 2007/083155 | 7/2007 |
| WO | WO 2007/136164 A1 | 11/2007 |
| WO | WO 2008/097723 A1 | 8/2008 |
| WO | WO 2008/139157 A1 | 11/2008 |
| WO | WO 2009/010757 | 1/2009 |
| WO | WO 2009/010758 | 1/2009 |
| WO | WO 2009/010759 | 1/2009 |
| WO | WO 2009/026466 | 2/2009 |
| WO | WO 2009/120404 A1 | 10/2009 |
| WO | WO 2009/128800 | 10/2009 |
| WO | WO 2010/040985 | 4/2010 |
| WO | WO 2010/040986 | 4/2010 |
| WO | WO 2010/060348 A1 | 6/2010 |
| WO | WO 2010/130975 A1 | 11/2010 |
| WO | WO 2010/130976 A1 | 11/2010 |

OTHER PUBLICATIONS

Chen et al., Binder Effect on Cycling Performance of Silicon/Carbon Composite Anodes for Lithium Ion Batteries, 36 (2006) 1099-1104.

Chen et al., "Effect of Vinylene Carbonate (VC) as Electrolyte Additive on Electrochemical Performance of Si Film Anode for Lithium Ion Batteries", Journal of Power Sources, 174(2), 538-543, (2007).

Chevrier et al., "Methods for Successful Cycling of Alloy Negative Electrodes in Li-Ion Cells", $220^{th}$ ECS Meeting, Abstract #1237 (2011).

Choi et al., "Effect of Fluoroethylene Carbonate Additive on Interfacial Properties of Silicon Thin-Film Electrode", Journal of Power Sources, 161(2), 1254-1259 (2006).

El Ouatani et al., "The Effect of Vinylene Carbonate Additive on Surface Film Formation on Both Electrodes in Li-Ion Batteries", J. Electrochem. Soc., 156(2), A103-A113 (2009).

Han et al., "Neutralized Poly (Acrylic Acid) as Polymer Binder for High Capacity Silicon Negative Electrodes", $220^{th}$ ECS Meeting, Abstract #1250 (2011).

Heinze et al., "Viscosity Behaviour of Multivalent Metal Ion-Containing Carboxymethyl Cellulose Solutions", Die Angewandte Makromolekulare Chamie 220, 123-132, (Nr. 3848), (1994).

Hochgatterer et al., "Silicon/Graphite Composite Electrodes for High Capacity Anodes: Influence of Binder Chemistry on Cycling Stability", Electrochemical and Solid-State Letters, 11 (5) (2008) A76-A80.

Komba et al., "Functional Interface of Polymer Modified Graphite Anode", Journal of Power Sources, 189, (2009), 197-203.

Komba et al., "Polyacrylate as Functional Binder for Silicon and Grapite Composite Electrode in Lithium-Ion Batteries", Electrochemistry, 79(1), (2011), 6-9.

Komba et al., "Polyacrylate Modifier for Graphite Anode of Lithium-Ion Batteries", Electrochemical and Solid-State Letters, 12(5), (2009), A107-A110.

Komba et al., "Study on Polymer Binders for High-Capacity SiO Negative Electrode of Li-Ion Batteries", Journal of Physical Chemistry, 115, (2011), 13487-13495.

(56) References Cited

OTHER PUBLICATIONS

Lee et al., "Effect of Poly (Acrylic Acid) on Adhesion Strength and Electrochemical Performance of Natural Graphite Negative Electrode for Lithium-Ion Batteries", Journal of Power Sources, 161(1), (2006), 612-616.

Li et al., "Sodium Carboxymethyl Cellulose: A Potential Binder for Si Negative Electrodes for Li-Ion Batteries", Electrochemical and Solid-State Letters, 10(2) (2007), A17-A20.

Liu et al., "Enhanced Cycle Life of Si Anode for Li-Ion Batteries by Using Modified Elastomeric Binder", Electrochemical and Solid-State Letters, 8(2) (2005), A100-A103.

Obrovac et al., "Structural Changes in Silicon Anodes During Lithium Insertion/Extraction", Electrochemical and Solid-State Letters, 7(5), (2004), A96-A96.

Sugama, et al., "Nature of Interfacial Interaction Mechanisms Between Polyacrylic Acid Macromolecules and Oxide Metal Surfaces", Journal of Materials Science, 19 (1984) 4045-4056.

Ui et al., "Improvement of Electrochemical Characteristics of Natural Graphite Negative Electrode Coated With Polyacrylic Acid in Pure Propylene Carbonate Electrolyte", Journal of Power Sources, 173(1), (2007), 518-521.

Wen et al., "Chemical Diffusion in Intermediate Phases in the Lithium-Silicon System", Journal of Solid State Chemistry, 37 (1981) 271-278.

Weydanz et al., "A Room Temperature Study of the Binary Lithium-Silicon and the Ternary Lithium—Chromium—Silicon System for use in Rechargeable Lithium Batteries", Journal of Power Sources, 81-82 (1999) 237-242.

Yabuuchi et al., "Graphite-Silicon-Polyacrylate Negative Electrodes inIonic Liquid Electrolyte for Safer Rechargeable Li-Ion Batteries", Advanced Energy Materials, 1, (2011), 759-765.

Zhang et al., "A Review on Electrolyte Additives for Lithium-Ion Batteries", Journal of Power Sources, 162(2), 1379-1394, (2006).

Key to Metal Aluminum-Silicon Alloys, www.keytometals.com/Article80.

Peng, K. et al., "Metal-Particle-Induced, Highly Localized Site-Specific Etching of Si and Formation of Single-Crystalline Si Nanowires in Aqueous Fluoride Solution", Chemistry A European Journal 2006, 12, pp. 7942-7947 (2006).

De Angelis et al., "Water Soluble Nanoporous Nanoparticles for In Vivo Targeted Drug Deliver and Controlled Release in B Cells Tumor Context", Nanoscale, 1020, vol. 2, p. 2230-2236.

Garrido, et al., The Role of Chemical Species in the Passivation of <100> Silicon Surfaces by HF in Water-Ethanol Solutions, J. Electrochem Soc., vol. 143, No. 12, 1996, p. 4059-4066.

Russo, et al., "A Mechanical Approach to Porous Silicon Nanoparticles Fabrication", Materials 2011, vol. 4, p. 1023-1033.

Takami et al., "Silicon Fiber Formed on Silicon Without Using a Gas Process", Journal of Applied Physics, vol. 91, No. 12, 2-5 (2002).

Ye et al., Controllable Growth of Silver Nanostructures by a Simple Replacement Reaction and Their SERS Studies, Solid State Sciences 11 (2009), p. 1088-1093.

"Peng Yun, et al. "Comparative Analysis of Two Different Treatment Technology in PCB Spent Etching-Cyclic Regeneration Technique and Copper Sulfate Processing Technique", Printed Circuit Information, No. 7, pp. 51-53, dated Jul. 10, 2007."

Winter, et al., "Insertion Electrode Materials for Rechargeable Lithium Batteries", Advanced Materials, 1998, 10, No. 10.

Kasavajjula et al., "Nano- and Bulk-Silicon-Based Insertion Anodes for Lithium-Ion Secondary Cells", Journal of Power Sources, 163 (2007) 1003-1039.

Peng, et al., "Fabrication of Single-Crystalline Silicon Nanowires by Scratching a Silicon Surface with Catalytic Metal Particles", Adv. Funct. Mater., 16 (2006), 387-394.

Barraclough et al., "Cold Compaction of Silicon Powders Without a Binding Agent", Materials Letters 61 (2007) 485-487.

International Search Report for PCT/GB2009/002351 dated Dec. 10, 2009.

Written Opinion of the International Searching Authority for PCT/GB2009/002351 dated Dec. 10, 2009.

Ivanovskaya et al., "The Effect of Treatment of Cation-Selective Glass Electrodes With AgNO3 Solution on Electrode Properties", Sensors and Actuators B 24-25 (1995) 304-308.

Peng et al., "Fabrication of Large-Area Silicon Nanowire p-n Junction Diode Arrays", Adv. Mater. (2004), vol. 16, No. 1, 73-76.

Peng et al., "Silicon Nanowires for Rechargeable Lithium-ion Battery Anodes", Applied Physics Letters (2008) vol. 93, No. 3, pp. 33105-1 to 33105-3.

British Search Report for GB0818644.7 dated Feb. 9, 2010.

Peng et al., "Uniform, Axial-Orientation Alignment of One-Dimensional Single-Crystal Silicon Nanostructure Arrays", Angew. Chem. Ind. Ed., 44 (2005) 2737-2742.

Peng et al., "Simultaneous Gold Deposition and Formation of Silicon Nanowire Arrays", Journal of Electroanalytical Chemistry, 558 (2003) 35-39.

Canham, L. T., "Diffusion of Li IN Si", Properties of Silicon, EMIS Datareviews Series No. 4 (1987) 454-462.

Qiu et al., "Self-Assembled Growth and Optical Emission of Silver-Capped Silicon Nanowires", Applied Physics Letters, vol. 84, No. 19, (2004) 3867-3869.

Kim et al., "(110) Silicon Etching for High Aspect Ratio Comb Structures", 1997 6th International Conference on Emerging Technologies and Factory Automation Proceedings, (1997) 248-252.

Sharma et al., "Thermodynamic Properties of the Lithium-Silicon System", J. Electrochem. Soc.: Electrochemical Science and Technology, vol. 123 (1976) 1763-1768.

Qiu et al., "From S1 Nanotubes to Nanowires: Synthesis, Characterization, and Self-Assembly", Journal of Crystal Growth, 277 (2005) 143-148.

Tokoro et al., "Anisotropic Etching Properties of Silicon in KOH and TMAH Solutions", Proceedings of the 1998 International Symposium on Micromechatronics and Human Science (1998) 65-70.

Tsuchiya et al., "Structural Fabrication Using Cesium Chloride Island Arrays as a Resist in a Fluorocarbon Reactive Ion Etching Plasma", Electrochemical and Solid-State Letters, 3 (1) (2000) 44-46.

Wagner et al., "Vapor-Liquid-Solid Mechanism of Single Crystal Growth", Applied Physics Letters, vol. 4, No. 5 (1964) 89-90.

Lang, Walter, "Silicon Microstructuring Technology", Materials Science and Engineering, R17 (1996) 1-55.

Liu et al., "Effect of Electrode Structure on Performance of Si Anode in Li-Ion Batteries: Si Particle Size and Conductive Additive", Journal of Power Source, 140 (2005) 139-144.

Weydanz et al., "A Room Temperature Study of the Binary Lithium-Silicon and the Ternary Lithium-Chromium-Silicon System for use in Rechargeable Lithium Batteries", Journal of Power Sources, 81-82 (1999) 237-242.

Yan et al., "H2-Assisted Control Growth of Si Nanowires", Journal of Crystal Growth, 257 (2003) 69-74.

Liu et al., "A Novel Method of Fabricating Porous Silicon Material: Ultrasonically Enhanced Anodic Electrochemical Etching", Solid State Communications, 127 (2003) 583-588.

Zhang et al., "Bulk-Quantity Si Nanowires Synthesized by SiO Sublimation", Journal of Crystal Growth, 212 (2000) 115-118.

Wong et al., "Controlled Growth of Silicon Nanowires Synthesized Via Solid-Liquid-Solid Mechanism", Science and Technology of Advanced Materials, 6 (2005) 330-334.

Zhang et al., "Synthesis of Thin Si Whiskers (Nanowires) Using $SiCl_4$", Journal of Crystal Growth, 2006 (2001) 185-191.

Yoshio et al., "Electrochemical Behaviors of Silicon Based Anode Material", Journal of Power Sources, 153 (2006) 375-379.

Zhang et al., "Catalytic Growth of x-$FiSi_2$ and Silicon Nanowires", Journal of Crystal Growth, 280 (2005) 286-291.

Badel et al., "Formation of Ordered Pore Arrays at the Nanoscale by Electrochemical Etching of N-Type Silicon", Superlattices and Microstructures, 36 (2004) 245-253.

Beaulieu et al., "Colossal Reversible Volume Changes in Lithium Alloys", Electrochemical and Solid-State Letters, 4 (9) (2001) A137-A140.

Beaulieu et al., "Reaction of Li with Grain-Boundary Atoms in Nanostructured Compounds", Journal of the Electrochemical Society, 147 (9) (2000) 3206-3212.

(56) References Cited

OTHER PUBLICATIONS

Besenhard et al., "Will Advanced Lithium-Alloy Anodes Have a Chance in Lithium-Ion Batteries?", Journal of Power Sources, 68 (1997) 87-90.

Boukamp et al., "All-Solid Lithium Electrodes with Mixed-Conductor Matrix", J. Electrochem. Soc.: Electrochemical Science and Technology, vol. 128, No. 4, (1981) 725-729.

Bourderau, et al., "Amorphous Silicon as a Possible Anode Material for Li-Ion Batteries", Journal of Power Sources, 81-82 (1999) 233-236.

Colinge, Jean-Pierre, "Silicon-on-Insulator Technology: Materials to VLSI", Chapter 2, SOI Materials, (1991), Cover page and p. 38.

Deal et al., "General Relationship for the Thermal Oxidation of Silicon", Journal of Applied Physics, vol. 36, No. 12, (Dec. 1965) 3770-3778.

Feng et al., "Lithography-Free Silicon Micro-Pillars as Catalyst Supports for Microfabricated Fuel Cell Applications", Electrochemistry Communications, 8 (2006) 1235-1238.

Green et al., "Quantum Pillar Structures on n+ Gallium Arsenide Fabricated Using "Natural" Lithography", Appl. Phys. Lett., 62 (3) (1993) 264-266.

Green et al., "Structured Silicon Anodes for Lithium Battery Applications", Electrochemical and Solid-State Letters, 6 (5) (2003) A75-A79.

Green et al., "Mesoscopic Hemisphere Arrays for use as Resist in Solid State Structure Fabrication", J. Vac. Sci. Technol. B 17(5) (1999) 2074-2083.

Yan et al., "Growth of Amorphous Silicon Nanowires via a Solid-Liquid-Solid Mechanism", Chemical Physics Letters, 323 (2000) 224-228.

Shin et al., "Porous Silicon Negative Electrodes for Rechargeable Lithium Batteries", Journal of Power Sources, 139 (2005) 314-320.

Li et al., "A High Capacity Nano-Si Composite Anode Material for Lithium Rechargeable Batteries", Electrochemical and Solid-State Letters, 2 (11) (1999) 547-549.

Li et al., "The Crystal Structural Evolution of Nano-Si Anode Caused by Lithium Insertion and Extraction at Room Temperature", Solid State Ionics, 135 (2000) 181-191.

Huggins, Robert A., "Lithium Alloy Anodes" in Handbook of Battery Materials, J.O. Besenhard Ed., Wiley-VCH, Weinheim, 361-381 (1999).

Chang et al., "Ultrafast Growth of Single-Crystalline Si Nanowires", Materials Letters, 60 (2006) 2125-2128.

Kim et al., "Improvement of Silicon Powder Negative Electrodes by Copper Electroless Deposition for Lithium Secondary Batteries", Journal of Power Sources, 147 (2005) 227-233.

Jianfeng et al., "Large-Scale Array of Highly Oriented Silicon-Rich Micro/Nanowires Induced by Gas Flow Steering", Solid State Communications, 133 (2005) 271-275.

Lu et al., "A Study of the Mechanisms of Erosion in Silicon Single Crystals Using Hertzian Fracture Tests", Wear, 186-187 (1995) 105-116.

Kleimann et al., "Formation of Wide and Deep Pores in Silicon by Electrochemical Etching", Materials Science and Engineering, B69-70 (2000) 29-33.

Kolasinski, Kurt W., "Silicon Nanostructures from Electroless Electrochemical Etching", Current Opinion in Solid State and Materials Science, 9 (2005) 73-83.

Pei et al., "Silicon Nanowires Grown from Silicon Monoxide Under Hydrothermal Conditions", Journal of Crystal Growth, 289 (2006) 423-427.

Chen et al., "Selective Etching of Silicon in Aqueous Ammonia Solution", Sensors and Actuators, A 49 (1995) 115-121.

Maranchi et al., "Interfacial Properties of the a-Si/Cu:Active-Inactive Thin-Film Anode Systems for Lithium-Ion Batteries", Journal of the Electrochemical Society: 153 (6) (2006) A1246-A1253.

Nakahata et al., "Fabrication of Lotus-Type Porous Silicon by Unidirectional Solidification in Hyrdogen", Materials Science and Engineering A 384 (2004) 373-376.

Niparko, J.K. (Editor), "Cochlear Implant Technology", Pub., Lippincott Williams and Wilkins, Philadelphia, (2000) 108-121.

Ohara et al., "A Thin Film Silicon Anode for Li-Ion Batteries Having a Very Large Specific Capacity and Long Cycle Life", Journal of Power Sources, 136 (2004) 303-306.

Peng et al., "Dendrite-Assisted Growth of Silicon Nanowires in Electroless Metal Deposition", Adv. Funct. Mater., 13, No. 2 (2003) 127-132.

Peng et al., "Synthesis of Large-Area Silicon Nanowire Arrays via Self-Assembling Nanoelectrochemistry", Adv. Mater., 14, No. 16 (2002) 1164-1167.

\* cited by examiner

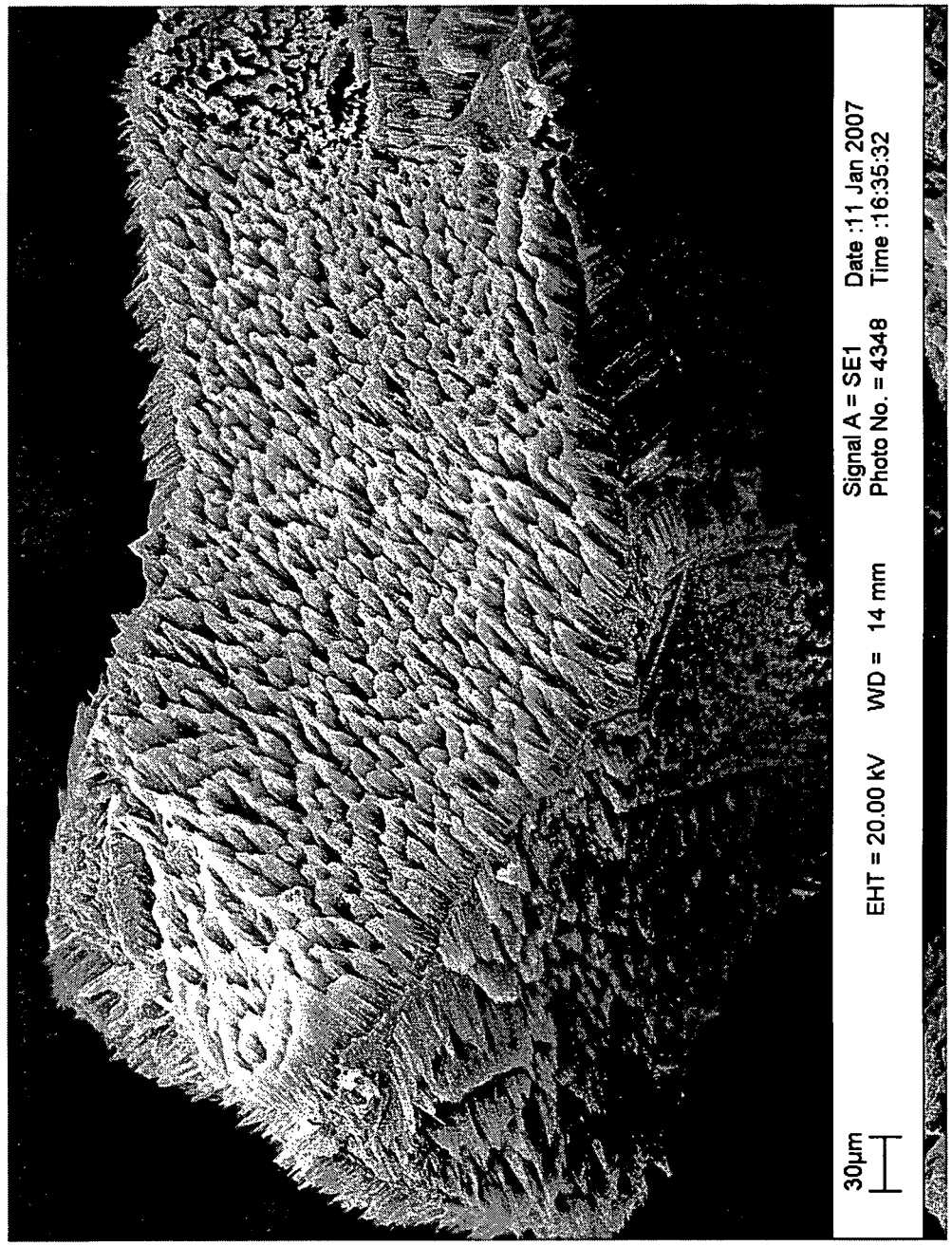

METHOD OF FABRICATING STRUCTURED PARTICLES COMPOSED OF SILICON OR A SILICON-BASED MATERIAL

TECHNICAL FIELD

The invention relates to a method of fabricating a particle having pillars etched on its surface, a method of making silicon fibres by detaching the pillars from the underlying particles, an electrode containing such particles or fibres as its active material, an electrochemical cell and a lithium rechargeable cell anode.

BACKGROUND ART

Lithium-ion rechargeable battery cells currently use a graphite-based anode. It is well known that silicon can be used instead of graphite as the active anode material (see, for example, Insertion Electrode Materials for Rechargeable Lithium Batteries, M. Winter, J. O. Besenhard, M. E. Spahr, and P. Novak in Adv. Mater. 1998, 10, No. 10) and it has been proposed that the silicon anode material may be in the form of pillars (or fibres) of silicon.

A method of making such silicon pillars is described in Peng K-Q, Yan, Y-J, Gao S-P, and Zhu J., Adv. Materials, 14 (2002), 1164-1167, Adv. Functional Materials, (2003), 13, No 2 February, 127-132 and Adv. Materials, 16 (2004), 73-76. Peng, et al. have shown a way to make nano pillars on silicon by a chemical method. According to this method, a silicon wafer, which may be n- or p-type and has the {111} face exposed to solution, is etched at 50° C. using the following solution: 5M HF and 20 mM AgNO$_3$. The mechanism postulated in these papers is that isolated nanoclusters of silver are electrolessly deposited on the silicon surface in an initial stage (nucleation). In a second (etching) stage, the silver nanoclusters and the areas of silicon surrounding them act as local electrodes that cause the electrolytic oxidation of the silicon in the areas surrounding the silver nanoclusters to form SiF$_6$ cations, which diffuse away from the etching site to leave the silicon underlying the silver nanocluster in the form pillars.

K. Peng et al., Angew. Chem. Int. Ed., 44 (2005), 2737-2742; and K. Peng et al., Adv. Funct. Mater., 16 (2006), 387-394, relate to a method of etching a silicon wafer that is similar to that described in the earlier papers by Peng et al but the nucleation/silver nanoparticle deposition step and the etching step are performed in different solutions. In a first (nucleation) step, a silicon chip is placed in a solution of 4.6M HF and 0.01M AgNO$_3$ for 1 minute. A second (etching) step is then performed in a different solution, namely 4.6M HF and 0.135M Fe(NO$_3$)$_3$ for 30 or 50 minutes. Both steps are carried out at 50° C. In these papers, a different mechanism is proposed for the etching step as compared to the earlier papers, namely that silicon underlying the silver (Ag) nanoparticles are removed and the nanoparticles gradually sink into the bulk silicon, leaving columns of silicon in the areas that are not directly underlying the silver nanoparticles.

In order to increase the uniformity and density of the pillars grown on silicon wafers and the speed of growth, it has been proposed in WO2007/083152 to conduct the process in the presence of an alcohol.

WO2009/010758 discloses the etching of silicon powder instead of wafers, in order to make silicon material for use in lithium ion batteries. The resulting pillar particles, an example of which is shown in FIG. 2, contain pillars on their surface and the whole of the resulting particles can be used in the anode material of the batteries; alternatively, the pillars can be severed from the particles to form silicon fibres and only the silicon fibres are used to make the anode. The etching method used is the same as that disclosed in WO2007/083152.

DISCLOSURE OF THE INVENTION

The first aspect of the present invention provides a process for etching silicon to form pillars; the process involves depositing silver onto silicon as part of the etching procedure. The silver is still present after the silicon has been etched and can be removed by treatment with nitric acid. The present invention provides a process whereby this removed silver can be recycled, thereby reducing the costs of the overall process.

The present applicants have found that it is possible to recycle the silver by dissolving it from the silicon in nitric acid and that the recovered silver solution can be reused directly in the etching of further silicon and that this cyclical procedure can be performed repeatedly.

The process of the present invention comprises:
treating silicon, which may be in the form of granules or in the form of bulk material, e.g. wafers, with an etching solution comprising HF, Ag$^+$ ions and nitrate ions, thereby etching the silicon to form particles having etched pillars on its surface, which silicon include a surface deposit of silver,
separating the etched silicon from the spent etching solution,
dissolving the silver from the etched silicon using nitric acid to form a solution containing Ag$^+$ ions and nitrate ions,
mixing the solution containing Ag$^+$ ions and nitrate ions with further HF to form a further etching solution, and
using the further etching solution to treat further silicon.

The spent etching solution may also be recycled: it can be regenerated by mixing it with further HF and with the solution containing Ag$^+$ ions and nitrate ions to form the further etching solution.

DESCRIPTION OF THE DRAWING

FIG. 1 is an electron micrograph of a pillared particle.

SPECIFIC DESCRIPTION OF PREFERRED EMBODIMENTS

In the following description, the invention will be described by reference to etching of granular silicon to form etched silicon particles. However the same considerations apply also to silicon in the form of bulk material, e.g. silicon wafers.

The process will take place in two stages, nucleation and etching. In nucleation, islands of silver are deposited electrolessly on the silicon granules according to the reaction:

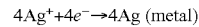

$$4Ag^+ + 4e^- \rightarrow 4Ag \text{ (metal)}$$

Nucleation will generally take up to about 1 minute.

The etching occurs preferentially along certain crystal planes and so the silicon is etched into columns. The silicon is etched according to the following equation:

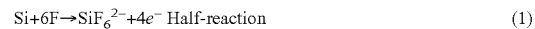

$$Si + 6F^- \rightarrow SiF_6^{2-} + 4e^- \text{ Half-reaction} \tag{1}$$

The electrons generated by half reaction (1) are conducted through the silicon to the deposited silver where the counter reaction occurs in which silver ions in the solution are reduced to elemental silver:

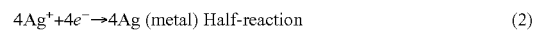

$$4Ag^+ + 4e^- \rightarrow 4Ag \text{ (metal) Half-reaction} \tag{2}$$

The deposited elemental silver forms dendrites extending from the initially deposited islands of silver. The dendrites will interlock with dendrites on the same particle and on other particles and so form a mat. The interconnection of the dendrites speeds up the electrolytic process because there are more sites where the reduction half reaction (2) can take place and the charge can be delocalised. Some gas will be evolved in the process and this can cause the mat to float.

Although the process can be stirred, there is no need to do so and it would be disadvantageous to do so if the stirring breaks up the mat.

The granular silicon starting material may comprise undoped silicon, doped silicon of either the p- or n-type or a mixture, such as a silicon-aluminium doped silicon. It is preferred that the silicon has some doping since it improves the conductivity of the silicon during the etching process. We have found that p-doped silicon having $10^{19}$ to $10^{20}$ carriers/cc works well. Such material may be obtained by grinding doped silicon, e.g. silicon from the IC industry, and then sieving the ground material to obtain granules with the desired size.

Alternatively, the granules may be relatively low purity metallurgical grade silicon, which is available commercially; metallurgical grade silicon is particularly suitable because of the relatively high density of defects (compared to silicon wafers used in the semiconductor industry). This leads to a low resistance and hence high conductivity, which is advantageous when the silicon pillar particles or fibres are used as anode material in a rechargeable battery. Such silicon may be ground and graded. An example of metallurgical grade silicon is "Silgrain" from Elkem of Norway, which can be ground and sieved (if necessary) to produce particles having a mean particle diameter in the range 5 to 500 μm, e.g. 15 to 500 μm, preferably 15 to 40 μm for pillar particles and 50 to 500 μm for making fibres. The granules may be regular or irregular in cross section. When making silicon fibres, the granules remaining after the fibres have been removed can be recycled for further etching.

The granules may have a silicon-purity of 90.00% or over by mass, preferably 99.0% to 99.99%. The silicon can be doped with any material for example, germanium, phosphorous, aluminium, silver, boron and/or zinc The granules used for etching may be crystalline for example mono- or poly-crystalline with a crystallite size equal to or greater than the required pillar height. The polycrystalline particle may comprise any number of crystals for example two or more.

The process may be carried out at a temperature of 0° C. to 70° C., although it is easiest to carry it out at room temperature since only very expensive containers will be able to withstand the highly corrosive HF at temperatures towards the top end of the above range. For that reason, the temperature will generally not exceed 40° C. If necessary, the reaction mixture may have to be cooled in the course of the process since it is exothermic.

The preferred material for the reaction container is polypropylene but other HF-resistant materials may be used instead.

The etching procedure should be terminated at a time when the silicon has been etched sufficiently to provide well-defined pillars of a height of 1 to 100 μm, e.g. 3 to 100 μm, more preferably 5 to 40 μm. The pillar height for pillar particles will generally be 5 to 15 μm and when making fibres will be larger, e.g. 10 to 50 μm. The optimum duration of the process will depend on the concentration of the materials in the solution, the conductivity of the silicon, the temperature and the amounts of etching solution relative to the amount of silicon.

The pillars will generally taper away from their bases, i.e. where they are attached to the underlying silicon, and the diameter of the pillars at their bases will generally be of the order of 0.08 to 0.70 μm, e.g. 0.1 to 0.5 μm, for example 0.2 to 0.4 μm, and such as 0.3 μm or above The pillars will thus generally have an aspect ratio of greater than 10:1. The pillars may be substantially circular cross-section but they need not be.

A pillar surface density may be used to define the density of the pillars on the surface of the particle. Herein, this is defined as $F=P/[R+P]$ wherein: F is the pillar surface density; P is the total surface area of the particle occupied by pillars; and R is the total surface area of the particle unoccupied by pillars.

The larger the pillar surface density, the larger the lithium capacity per unit area of a silicon particle electrode and the larger the amount of harvestable pillars available to create fibres. For example, using the above-mentioned silicon powder from Elken of Norway having a pre-etching mean particle diameter of 400 μm, pillars can be produced all over the surface having a pillar height of approximately 10 to 30 μm, a diameter of approximately 0.2 to 0.5 μm and a pillar surface density, F, of 10-50%, more typically, 30%.

In another example, granules having a pre-etching mean particle diameter of approximately 63-80 μm are found to produce pillars with a height of approximately 10 to 15 μm, with a coverage of approximately 30% and a diameter of approximately 0.2 to 0.5 μm.

The nucleation stage and the dendrite growth require the presence of silver in the solution, but once these are completed, etching requires only the presence of an ion in solution that can be reduced. This can be silver (half reaction 2) but equally it need not be and since silver is expensive, it is preferred to use some other counter reaction other than silver. In WO2007/083152 the present applicants have suggested the addition of ferric nitrate to provide ferric ions that can be reduced to ferrous ions in a counter reaction. They also suggest the reduction of hydrogen ions as an alternative counter reaction.

We have found that the optimum counter reaction is the reduction of nitrate ions in solution, which fits in well with the recycling of the silver nitrate to form further etching solution. Although WO2007/083152 suggests that nitrate ions be added in the etching step, this is in the form of silver nitrate or ferric nitrate. Both are expensive and the former is particularly so. In addition to the nitrate in the recycled silver solution, further nitrate can be added to the etching solution either before the etching starts or during the etching process or both. It is preferred to add further nitrate part of the way through the etching procedure and we add nitrate to the etching solution as an alkali metal nitrate, particularly sodium nitrate, or as ammonium nitrate because these materials have a high solubility but are also cheaper than ferric nitrate and have inert cations ($Na^+$, and $NH_4^+$) that can are not detrimental if they build up in the solution over the course of several cycles.

The etching solution is, according to one embodiment, substantially free of iron ions (ferric or ferrous). By "substantially free" we mean that there is an insufficient concentration to have a material effect on the process and should generally be less than 0.05% by weight and less than 5 mM, e.g. less than 2.5 mM.

It is a feature of WO2007/083152 that an alcohol should be present in the nucleation stage and should be present in an amount of 1 to 40%. The process of WO2007/083152 was carried out on a chip or wafer and we have found that, in the context of the present process carried out on silicon granules, the presence of alcohol is not necessary and its presence complicates the process since it is another ingredient that must be considered when controlling the concentrations in the solution. Accordingly, the solution used in the present invention is, in accordance with one embodiment of the present invention, substantially free of an alcohol, by which is meant that the amount of any alcohol is less than the concentration that has a material effect on the process and may be less than 0.5% by volume.

The solution used at the start of the etching procedure in the present invention has a concentration of HF of 5 to 10M, e.g. 7M to 9M and generally 6-8M, such as about 7 or 7.5M. There is no need to add further HF in the course of the process although this is possible if a large amount of material is etched compared to the volume of the solution.

In order to deposit the islands of silver and the dendrites, the concentration of $Ag^+$ may be in the range 0.01M to 0.1M, e.g. 0.02 to 0.06M and generally about 0.03M. The amount of $Ag^+$ ions is preferably insufficient to participate in the etching of all the silicon in the process but rather should be limited to an amount sufficient only to cause the islands and dendrites. The half reaction that counters the etching half reaction is then provided by the reduction of nitrate ions. Silver is preferably not added to the solution after the etching reaction has started.

As indicated, reduction of $NO_3^-$ may provide a counter reaction to the etching of the silicon (half reaction (1)) and may be present in an amount of the concentration of 0.02M to 0.2M, e.g. 0.04M to 0.08M, e.g. about 0.06M. The silver will generally be added in the form of its nitrate salt since other salts are generally insoluble. This will provide some of the nitrate ions required and any balance may be made up by adding alkali metal nitrate, e.g. sodium nitrate, or ammonium nitrate. In order to provide additional nitrate ions for the etching, nitrate ions may added in the course of the process.

$SiF_6^{2-}$ will be present in the solution as a result of the etching of the silicon The solution may also contain nitric acid from the recycled silver nitrate solution.

Before etching, the composition of the etching solution may be adjusted by adding a base, preferably NaOH or $NH_4OH$ because they are cheap and the cations are highly soluble. Nitric acid may be used to acidify the solution.

Apart from water, the solution according to an embodiment of the present invention may contain no other ingredients. Such a solution would at the start of the process consist essentially of:

5 to 10M (e.g. 6 to 8M) HF
0.01 to 0.1M $Ag^+$ ions
0.02 to 0.2M $NO_3^-$ ions
water, hydrogen and hydroxyl ions
and optionally:
$SiF_6^{2-}$ ions
alkali metal or ammonium ions, and
incidental additions and impurities.

After etching is complete, the etched particles will be separated from the spent etching solution. They will retain the silver deposited in the course of the etching process. The silver can be dissolved from the etched particles using nitric acid to form a solution containing $Ag^+$ ions and nitrate ions that can be directly recycled by mixing it with further HF to form a further etching solution. Further silver nitrate may also be added.

In addition to recycling the silver, the spent etching solution can be regenerated by adding additional HF and also the recycled solution containing $Ag^+$ ions and nitrate ions to form the further etching solution.

If the spent etching solution is recycled, $SiF_6^{2-}$ ions can accumulate in the etching solution although that is not necessarily be the case since some of the etching solution will be entrained with the etched silicon product and will generally be discarded after the silicon product is washed.

The process described herein discloses the addition of sodium salts, e.g. hydroxides and nitrates, to the etching solution. These sodium salts can be replaced with the corresponding ammonium salt and this can be advantageous since $(NH_4)_2SiF_6$ is much more soluble than $Na_2SiF_6$ and so if there is an accumulation of $SiF_6^{2-}$ ions, a substantial quantity can be retained in solution without precipitating.

The etched particles that are separated from the spent etching solution may be washed and thoroughly drained prior to dissolving the silver from the etched particles.

The amount of etching solution used relative to the amount of silicon granules should be sufficient to etch the required pillars. We have found that 3 liters of the etching solution for 20 grams of silicon granules provides good results but the relative proportions might need to be adjusted as the quantities are scaled up or down.

The invention will now be illustrated by reference to one or more of the following non-limiting examples:

EXAMPLE 1

To Obtain Pillar Particles

The reaction was conducted in a polyethylene container with 8 liter volume. A lid is provided that has a hole for introducing ingredients and a stirrer.

The following reactants were used

| | |
|---|---|
| Silicon Powder—Si | Elkem Silgrain HQ J272.1, having a particle size of 20-40 µm; larger particle sizes were eliminated by sieving and washing the powder in deionised water 3 times |
| Hydrofluoric acid—HF | Aldrich Honeywell, 17735, 40% (w/w) semiconductor grade PURANAL ™ |
| Recycled $AgNO_3/HNO_3$ solution | concentrations of $AgNO_3$ and $HNO_3$ are 2.56 M and 3.65 M respectively |
| Sodium nitrate—$NaNO_3$ | Sigma-Aldrich, Anhydrous, crystal powder, ACS reagent, ≥99.0% |
| Sodium hydroxide—NaOH | VWR BDH AnalaR, Lot B0138150 734, Prod 102525P |
| Nitric acid | 68%, GPR RECTAPUR, VWR |

The reaction was conducted at room temperature (10-25° C.).

First Cycle 35 ml of the $AgNO_3/HNO_3$ solution containing 2.56 M and 3.65 M $AgNO_3/HNO_3$ respectively is mixed with 3 liters 7M HF solution in the reaction chamber and then 5.1 gram NaOH (or 4.5 gram $NH_4OH$) dissolved in 30 ml water is added. The resulting solution contains 0.0299M $AgNO_3$. The $AgNO_3/HNO_3$ solution may be recycled from an earlier etching procedure (see below) but if none is available, it may be made up from commercially available sources of silver nitrate and nitric acid.

20 gram sieved and washed Si powder (<40 µm) is added through the hole in the lid of the container by means of a funnel and then the mass is gently stirred by hand through the hole in the lid using a rod, for 1 minute. This reaction mixture is allowed to stand for 40 minutes. A "mat" of silicon plus silver forms on the surface of the etch solution in the first 1-2 minutes.

After 40 minutes, 15 gram $NaNO_3$ (or 13 gram $NH_4NO_3$) is added. The $NaNO_3$ (or $NH_4NO_3$) is dissolved into 50 ml of water and then added through the funnel. The solution is then stirred for about 1 min after the $NaNO_3$ (or $NH_4NO_3$) addition has been completed. The mixture is allowed to stand for a further 50 minutes. Then at 90 minutes from the start of the process, when the etching is almost complete, the spent etching solution starts to be pumped into a storage chamber, which takes about 4-5 minutes so the total etching time is about 95 minutes.

The mat is now washed with 3-4 liter water three times. The first two washes are such that the water is in contact for five minutes, while the third wash is a one minute wash.

The wet mat, which contains etched silicon particles and silver, is promptly drained as dry as possible and then it is put into a 300 ml glass beaker. 20 ml $H_2O$ and 20 ml concentrated $HNO_3$ (68%, GPR RECTAPUR, VWR) are then added and the mixture is allowed to stand for several hours, after which the solution will separate into two layers. The upper layer is clear solution (dilute $HNO_3$ with $AgNO_3$, referred to as "$AgNO_3/HNO_3$") and the bottom layer is the etched Si particles. The upper $AgNO_3/HNO_3$ solution is carefully decanted and kept for future using. The total solution is about 120 ml.

Second Cycle

The spent etch solution from the first cycle is now re-used and brought to full activity by the addition of 35 ml reclaimed $AgNO_3/HNO_3$ solution and 150 ml 40% HF and then 5.1 gram NaOH (or 4.5 gram $NH_4OH$) dissolved in 30 ml water is added.

Then 20 gram silicon granules are added to the reactivated etching solution, as in 1st cycle. After 40 minutes, 15 gram $NaNO_3$ (or 13 gram $NH_4NO_3$) is added. The mixture is allowed to stand for a further 50 minutes. Then at 90 minutes after the addition of the silicon, when the etching is almost completed, the spent etching solution starts to be pumped into a storage chamber, which takes about 4-5 minutes, and so the total etching time is about 95 minutes.

The mat is then washed with 3-4 liter water three times. The first two washes are such that the water is in contact for five minutes, while the third wash is a one minute wash.

The wet mat, which contains the etched silicon particles and silver, should be promptly treated with nitric acid to remove the silver, and further washed and stored wet. The nitric acid treatment is similar to that of the first batch, but instead of adding in 20 ml $HNO_3$+20 ml $H_2O$ to remove silver from the etched particles, 20 ml $HNO_3$+20 ml $AgNO_3/HNO_3$ solution from the first batch is used in order to reduce the amount of water in the $AgNO_3/HNO_3$ solution that is recycled (i.e. in order to increase the concentration of $AgNO_3$ and $HNO_3$ in the recycled liquid).

The silver nitrate/nitric acid liquid is recycled to the next cycle.

Third and Further Cycle

Same as the second cycle.

Variation

Instead of collecting the $AgNO_3/HNO_3$ solution after each cycle and using it in the subsequent cycle, batches of $HNO_3$-treated products (etched silicon and $AgNO_3/HNO_3$ solution) can be combined and treated together for use in etching further silicon granules.

A number of batches of $HNO_3$-treated products (e.g. ten batches, which amount to about 1000 ml) are collected and transferred into a centrifuge bucket. The mixture of batches is then centrifuged for about 15 min and the top layer $AgNO_3/HNO_3$ solution (#1) is collected. 200 ml de-ionised water is then added into the centrifuge bucket with the bottom layer of the etched silicon. and the mixture is allowed to stand for 30 min and then it is centrifuged again for 15 min. The upper clear solution (#2) is collected and mixed with the previous solution (#1) for recycle use.

In order to remove remenants of the solution from the etched silicon product, two more washes and centrifuges may be used. Solutions from the further treatments are called #3 and #4. Normally 95% or a little more silver will be reclaimed in #1 and #2 solutions. #3 and #4 will be stored together and treated by NaCl, to precipitate the silver as AgCl for reclaimation (but not recycling).

Control

The concentrations of silver and $HNO_3$ in the mixture of #1 and #2 may be analyzed respectively. The silver ion concentration is obtained by titration of $NH_4SCN$ with the indicator of $Fe(NO_3)_3$. The $HNO_3$ concentration is obtained by titration against NaOH with methyl red as the indicator. Finally, the composition of the $AgNO_3/HNO_3$ solution that is recycled, as described above, may be adjusted if necessary by adding some solid $AgNO_3$ and/or concentrated $HNO_3$ in order to get a consistent concentration of $AgNO_3$ and $HNO_3$ in the recycled $AgNO_3/HNO_3$ solution every time.

EXAMPLE 2

To Obtain Fibres

The reaction container and the reactants are the same as in Example 1. Again the reaction is conducted at room temperature.

40 ml of the $AgNO_3/HNO_3$ solution is mixed with 3 liters 7M HF solution in reaction chamber then 5.9 gram NaOH (or 5.2 gram $NH_4OH$) dissolved in 30 ml water is added. The final solution contains 0.033M $AgNO_3$.

20 gram Si powder (J272.1) is added through a funnel at top of the container and the mass is gently stirred by hand, through the hole in the lid using a rod, for 1 minute. This reaction mixture is allowed to stand for 40 minutes. The "mat" of silicon plus silver forms on the surface of the etch solution in the first 1-2 minutes.

At the end of the 40 minutes, 14 gram $NaNO_3$ (or 12 gram $NH_4NO_3$) is added. The $NaNO_3$ (or $NH_4NO_3$) is dissolved into 50 ml of water and then added through a funnel in the lid of the reaction container. The solution is stirred for about 1 min after this addition of nitrate. The mixture is allowed to stand for a further 50 minutes. Then at 90 minutes from the start of the process, when the etching is almost completed, the spent etching solution starts to be pumped into a storage chamber, which takes about 4-5 minutes, and so the total etching time is about 95 minutes.

The mat is now washed with 3-4 liter water three times. The first two washes are such that the water is in contact for five minutes, while the third wash is a one minute wash. The wet mat, which contains etched silicon particles and silver, is promptly treated with nitric acid to remove the silver as described in Example 1. Then (again following the procedure of Example 1) the particles are separated from the silver/nitric acid liquid and the etched silicon is further washed and stored wet. The silver nitrate/nitric acid liquid may be recycled.

Second Cycle

The spent etch solution from the first cycle is now re-used and brought to full activity by the addition of 40 ml reclaimed $AgNO_3/HNO_3$ solution and 150 ml 40% HF and then 5.9 gram NaOH (or 5.2 gram $NH_4OH$) dissolved in 30 ml water is added.

Then 20 gram silicon granules is added to the reactivated etching solution, as in 1st cycle. After 40 minutes, 14 gram $NaNO_3$ (or 12 gram $NH_4NO_3$) is added. The mixture is allowed to stand for a further 50 minutes. Then at 90 minutes after the addition of the silicon, when the etching is almost completed, the spent etching solution starts to be pumped into a storage chamber, which takes about 4-5 minutes, and so the total etching time is about 95 minutes.

The mat is then washed with 3-4 liter water three times. The first two washes are such that the water is in contact for five minutes, while the third wash is a one minute wash.

The wet mat, which contains the etched silicon particles and silver, is promptly treated with nitric acid to remove silver, and further washed and stored wet, as described in connection with the first cycle.

Third and Further Cycle

Same as the second cycle.

Fibres can be harvested from the resulting particles, with pillars attached, by ultrasonic vibration by placing the particles in a beaker or any appropriate container, covering the particles with an inert liquid such as ethanol or water and subjecting them to ultrasonic agitation. It is found that within several minutes the liquid is seen to be turbid and it can be seen by electron microscope examination that at this stage the pillars have been removed from the particle.

The pillars may be removed from the particle in a two stage process. In the first stage, the particles are washed several times in water and, if necessary, dried in a low vacuum system to remove the water. In the second stage, the particles are agitated in an ultrasonic bath to detach the pillars. These are suspended in water and then separated using a centrifuge.

The invention claimed is:

1. A process of etching silicon, the process comprising:
   treating silicon, e.g. granules or bulk material, with a solution comprising HF, $Ag^+$ ions and nitrate ions,
   forming silicon having etched structures on its surface, which silicon includes a surface deposit of silver,
   separating the etched silicon from a spent etching solution,
   dissolving the silver from the etched silicon using nitric acid to form a solution containing $Ag^+$ ions and nitrate ions,
   mixing the solution containing $Ag^+$ ions and nitrate ions with further HF to form a further solution, and
   using the further solution to treat further silicon.

2. The process of claim 1, wherein the further HF is composed of the spent etching solution and additional HF.

3. The process of claim 1, wherein the etched silicon separated from the spent etching solution is washed and drained prior to dissolving the silver from the etched silicon.

4. The process of claim 1, wherein the solution comprises:
   5 to 10M HF
   0.01 to 0.1 M $Ag^+$ ions
   0.02 to 0.2M $NO_3^-$ ions.

5. The process of claim 1, wherein the silicon is granular silicon having a particle size in the range 5 to 500 µm.

6. The process of claim 1, which is conducted at a temperature of 0° C. to 70° C.

7. The process of claim 1, wherein further $NO_3^-$ ions are added to the solution during at least one of the steps of treating and forming in one or several steps, e.g. further $NO_3^-$ ions are added after about 35% to 65% of the overall process time.

8. The process of claim 7, wherein the further $NO_3^-$ ions are added in the form of an alkali metal nitrate salt.

9. The process of claim 1, wherein the forming step is conducted for at least 10 mins.

10. The process of claim 1, wherein the solution has a concentration of HF of 6-9M.

11. The process of claim 1, wherein the concentration of $Ag^+$ in the solution is in the range of 0.02M to 0.06M.

12. The process of claim 1, wherein $NO_3^-$ is present in the solution in an amount of 0.04M to 0.08M.

13. The process of claim 1, which includes adjusting the composition of the further solution so that it has approximately the same composition of $Ag^+$ ions, $NO_3^-$ ions and HF as the first solution.

14. The process of claim 1, wherein the solution consists essentially of:
   5 to 10M HF
   0.01 to 0.1 M $Ag^+$ ions
   0.02 to 0.2M $NO_3^-$ ions
   water, hydrogen and hydroxyl ions
   and optionally:
   $SiF_6^{2-}$ ions
   alkali metal and/or ammonium ions, and
   incidental additions and impurities.

15. The process of claim 1, wherein the spent etching solution from two or more processes is collected together and the resulting collected etched silicon is treated with nitric acid as a batch.

16. The process of claim 1, which includes the further step of detaching the structures from the resulting etched silicon to form silicon fibres by one or more of scraping, agitating (especially by ultrasonic vibration) or chemical etching.

17. Etched silicon structures obtained from the process of claim 1.

18. An electrode containing the structures of claim 17 as one of its active materials.

19. An electrochemical cell containing an electrode as claimed in claim 18.

20. A process of etching silicon to form silicon having etched structures on its surface, the process comprising:
   (i) depositing silver onto silicon with a solution comprising HF, Ag+ ions and nitrate ions;
   (ii) etching the silver deposited silicon to give etched silicon having a surface deposit of silver;
   (iii) separating the etched silver deposited silicon from a spent etching solution;
   (iv) removing the surface deposit of silver by treatment with nitric acid to form a solution containing Ag+ ions and nitrate ions;
   (v) mixing the solution containing Ag+ ions and nitrate ions with further HF to form a further solution, and
   (vi) using the further solution to treat further silicon.

* * * * *